Dec. 27, 1932.  D. E. GRAY  1,892,463
GLASS WORKING MACHINE
Original Filed June 3, 1927   2 Sheets-Sheet 2

INVENTOR
DAVID E. GRAY.
BY
ATTORNEYS

Patented Dec. 27, 1932

1,892,463

UNITED STATES PATENT OFFICE

DAVID E. GRAY, OF CORNING, NEW YORK, ASSIGNOR TO CORNING GLASS WORKS, OF CORNING, NEW YORK, A CORPORATION OF NEW YORK

GLASS WORKING MACHINE

Original application filed June 3, 1927, Serial No. 196,214. Divided and this application filed October 31, 1928. Serial No. 316,313.

This invention relates to glass working machines and more particularly to a glass conveyor, such as is shown in my copending application filed June 3, 1927, Serial No. 196,214 of which this application is a division.

The primary object of the present invention is to advance a glass ribbon and articles formed therefrom through a series of successive stages including the forming of articles, the separating of the articles from the ribbon, and the depositing of the ribbon in a suitable cullet receiver.

Another object is to facilitate the discharge of the glass ribbon from the conveyor after the completed articles have been removed, and to reduce wear upon the orifice plates which cooperate in forming the conveyor.

A further object is to insure smooth uniform motion of the conveyor during its operative run and thereby procure accurate registration of the orifice plates with the associated mechanisms.

Among its features, my invention embodies an articulated carrier composed of a series of orifice plates which during their operative run are disposed in a horizontal plane to support the ribbon of glass. These plates are pivoted to an endless chain in such a manner that when their operative run is completed, they will fall away from the glass ribbon, thus withdrawing support therefrom and permitting it to discharge from the carrier.

Another feature of the invention is the manner in which the chain is engaged by the driving and smoothing wheels to produce uniform motion and accurate registration of the orifice plates with the associated mechanism.

Referring to the accompanying drawings, in which the corresponding parts are represented by corresponding marks of reference:—

Figure 1:
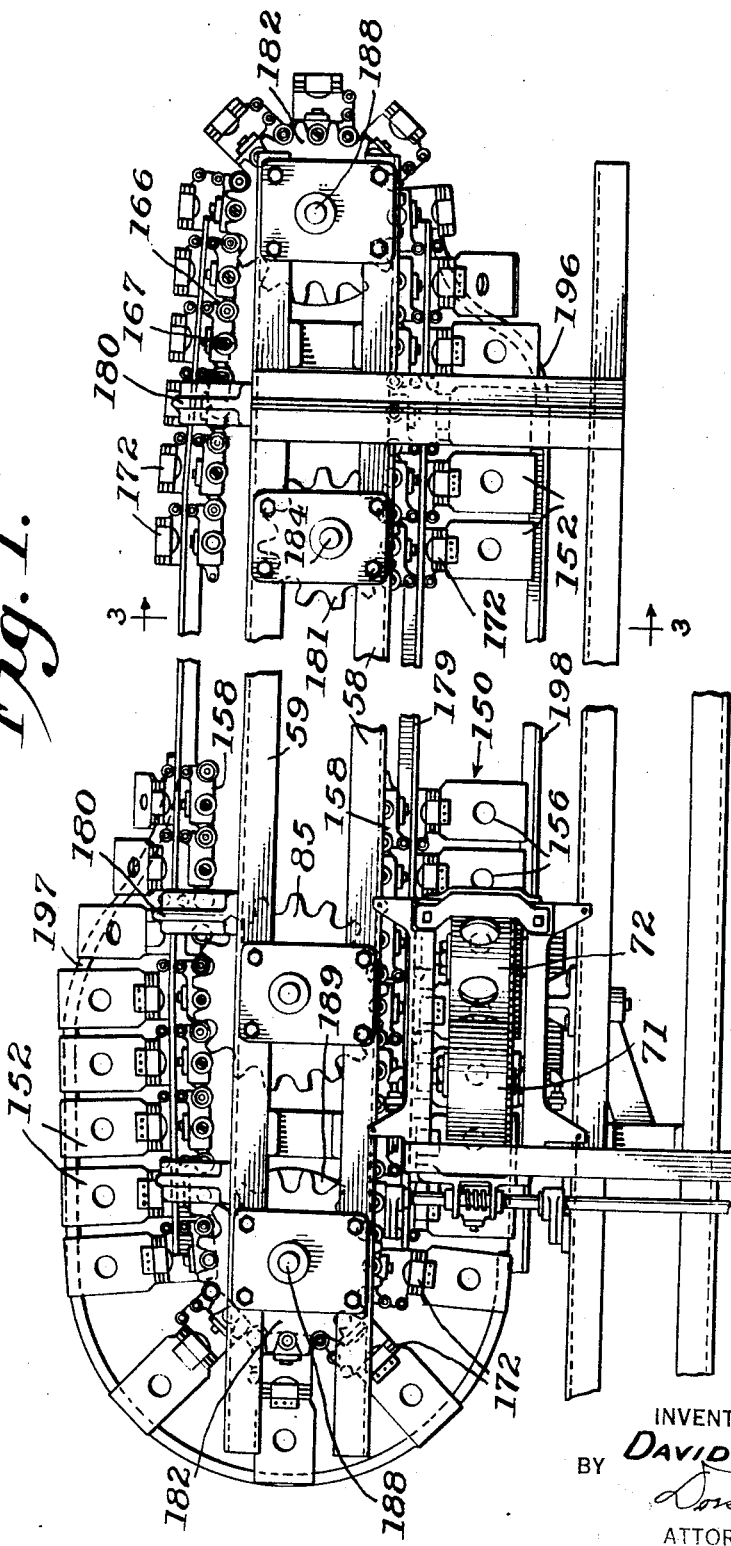
Fig. 1 is a fragmentary plan view of a conveyor constructed in accordance with my invention.
Figure 2:
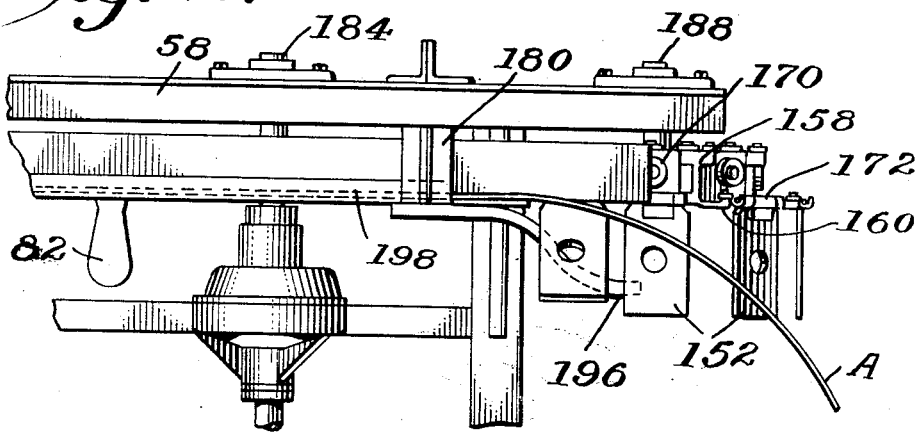
Fig. 2 is a fragmentary side elevation of the delivery end of such a machine.
Figure 3:
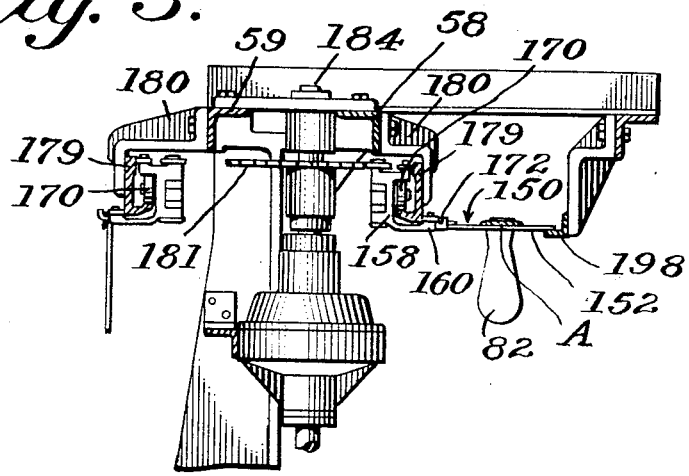
Fig. 3 is a transverse section taken on the line 3—3 of Fig. 1.

The drawings illustrate a part of a glass working machine such as is fully described in the application of Woods and Gray, Serial No. 183,491, filed April 13, 1927.

In such a machine a ribbon of glass A is formed by forming rolls 71 and 72, and deposited on an endless conveyor apron 150 moving in a closed path and by it is carried along in registration with forming mechanisms by which portions of the glass are formed into articles, such as bulbs 82 pendant beneath apertures 156 in the apron.

This application is directed to the construction of the apron.

In carrying my invention into practice I employ a frame which includes a pair of horizontally disposed spaced parallel rails 58 and 59 which are connected together near opposite ends by plates carrying bearings in which vertically disposed shafts 188 are mounted. Supported on brackets 180 carried by the rails 58 and 59 are the guide rails 179 having inwardly extending flanges upon which the supporting rollers 170 of an apron supporting carrier chain 158 run. Supported on the shafts 188 are pairs of arcuate guides which in the present embodiment of my invention take the form of sprockets 182 the lowermost of which are provided on their bottom faces with guide flanges 189 for supporting the apron supporting carrier chain 158 after it leaves the guide rails 179.

The carrier chain 158 consists of a series of relatively long links pivoted together and moving in a closed path along the guide rails 179 and around the guide sprockets 182. Each link of the carrier chain is provided with a supporting roller 170 and an outwardly extending horizontal base flange 160. Pivoted at 172 to the outer ends of the flanges 160 are plates 152 which are formed with the apertures 156 and cooperate with each other in forming the conveyor apron 150. Thus it will be seen that the conveyor apron 150 moves in unison with the carrier chain 158.

Due to the mounting of the plates 152 they are free to swing downwardly on their pivots 172 when unsupported in horizontal position. During the operative run, which is straight, and extends from beneath the ribbon forming rolls 71 and 72 to near the delivery end of the machine, the plates 152 are held in a horizontal position by the rail 198, engaging under their free ends. When in such position, the plates 152 are adjacent to each other, and form a continuous surface to receive the ribbon deposited thereon from the ribbon forming rollers 71 and 72. They however swing downwardly at the end of such run under the control of a drop cam 196, and are elevated again into horizontal position by a corresponding lift cam 197, just before they reach the feed end of the machine on their return run.

In order to insure the stability of the plates 152 it is desirable to have a long pivotal connection at 172 between a plate and its respective link. This necessitates the use of relatively long links and since it is well known that a coarse or long linked chain when driven in the ordinary manner, i. e. by having a drive sprocket, the teeth of which engage only one point of each link, moves unevenly and has not heretofore proven suitable for use where uniform motion is necessary, I have found it advantageous to introduce a separate driving wheel 181 which co-acts with the chain 158 in a manner comparable with a pinion and rack having relatively fine pitch teeth.

To this end, the hinge pin of each link of the carrier chain is provided at its upper end with a drive roller 166, and secured intermediate the ends of each link is a vertical pin upon which intermediate drive rollers 167 are mounted. Secured to a drive shaft 184 near the discharge end of the machine is a driving wheel 181 which is provided with teeth for engagement with each drive roller as it is presented thereto. The drive wheel 181 is arranged to engage only the front run of the carrier chain so as to keep it under tension. Rotatably mounted on a vertical shaft near the loading end of the machine is a smoothing wheel 85 which like the drive wheel 181 is provided with teeth which engage each drive roller of the chain. This smoothing wheel is of a diameter equal to the distance between the front and back runs of the chain so that as the front run moves, pull will be exerted on the back run, thus placing it under tension. In this manner the idler sprockets 182 act only in the capacity of guides and are relieved of any operating load. Moreover by multiplying the points of contact of the driving and smoothing wheels with the chain by means of the drive rollers 167, I obtain the desired smoothness of operation without reducing the width of the bearings of the plates 152 and thereby decreasing their stability.

While I have described the lift cam 197 as being positioned so as to elevate the plates 152 to the horizontal just before they reach the feed end of the machine, it is obvious that this cam may be located at any desirable point, also while I have illustrated and described only two drive rollers 166 and 167 on each link 158, I wish it to be understood that I may multiply the number of points of driving contact between the driving wheel 181 and the chain without in any way departing from the spirit and scope of the invention. In fact it may even be found desirable to cut rack teeth on the backs of the links and to substitute a gear for the driving wheel 181 in order to obtain sufficiently smooth operation of the chain for certain purposes.

Having thus described my invention, what I claim is:

1. In a glass forming machine, a moving conveyer comprising articulated links moving in a horizontally closed path, plates carried by the links, said plates forming on the operative run of the conveyer a continuous glass supporting surface and means for lowering the plates out of glass supporting position near the end of the operative run of the conveyer.

2. In a glass forming machine, a link belt moving in a horizontally closed path and plates hinged to the links, said plates forming on the operative run of the conveyer a continuous glass supporting surface.

3. In a glass forming machine, a belt moving in a horizontal path, said belt comprising a series of links each having a plate pivoted on a horizontal axis, the plates forming on the one run of the belt a continuous surface to receive and support a ribbon of plastic glass.

4. In a mechanism of the class described, the combination with a belt consisting of articulated links, idlers at the opposite ends of the run of the belt, trackways guiding the belt between the idlers and a drive wheel engaging only one run of the belt, and a toothed wheel engaging on its opposite sides with both runs of the belt, and having its teeth so spaced that a plurality of teeth engage with each link of the belt.

5. In a glass forming machine a link belt moving in a horizontally closed path, plates hinged to the links and forming on the operative run of the conveyer a continuous glass supporting surface and a load distributing means connecting the operative and inoperative runs of the conveyer for maintaining uniform motion between them.

6. In a glass forming machine, a belt moving in a horizontal path, said belt comprising a series of links each having a plate pivoted on a horizontal axis, the plates forming on one run of the belt a continuous surface to receive and support a ribbon of plastic glass and a toothed wheel engaging both runs of the belt to cause them to move at a uniform rate of travel.

DAVID E. GRAY.